US011062197B2

(12) United States Patent
Lin et al.

(10) Patent No.: US 11,062,197 B2
(45) Date of Patent: Jul. 13, 2021

(54) NEUROMORPHIC COMPUTING SYSTEM AND CURRENT ESTIMATION METHOD USING THE SAME

(71) Applicant: MACRONIX INTERNATIONAL CO., LTD., Hsinchu (TW)

(72) Inventors: Yu-Yu Lin, New Taipei (TW); Feng-Min Lee, Hsinchu (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 920 days.

(21) Appl. No.: 15/803,971

(22) Filed: Nov. 6, 2017

(65) Prior Publication Data

US 2019/0138881 A1 May 9, 2019

(51) Int. Cl.
*G06N 3/04* (2006.01)
*G06F 17/12* (2006.01)

(52) U.S. Cl.
CPC ............ *G06N 3/04* (2013.01); *G06F 17/12* (2013.01)

(58) Field of Classification Search
CPC .......... G06N 3/04; G06N 3/082; G06N 3/084; G06F 17/12
See application file for complete search history.

(56) References Cited

U.S. PATENT DOCUMENTS

| 7,505,347 | B2 | 3/2009 | Rinerson et al. |
| 8,773,887 | B1 | 7/2014 | Naji |
| 9,019,746 | B2 | 4/2015 | Yim et al. |
| 2010/0067286 | A1 | 3/2010 | Taylor et al. |
| 2015/0278682 | A1* | 10/2015 | Saxena .................. G11C 11/54 706/23 |
| 2017/0053704 | A1 | 2/2017 | Nagashima |
| 2018/0075337 | A1* | 3/2018 | Buchanan ............ G06N 3/0635 |

OTHER PUBLICATIONS

Kim et al., "A Functional Hybrid Memristor Crossbar-Array/CMOS System for Data Storage and Neuromorphic Applications", Published: Dec. 5, 2011, Nano Lett. 2012, 12, pp. 389-395. (Year: 2011).*
Hasan et al., "Enabling Back Propagation Training of Memristor Crossbar Neuromorphic Processors", 2014, 2014 International Joint Conference on Neural Networks (IJCNN), pp. 21-28. (Year: 2014).*

* cited by examiner

*Primary Examiner* — Kamran Afshar
*Assistant Examiner* — Ying Yu Chen
(74) *Attorney, Agent, or Firm* — McClure, Qualey & Rodack, LLP

(57) ABSTRACT

A neuromorphic computing system includes a synapse array, a switching circuit, a sensing circuit and a processing circuit. The synapse array includes row lines, column lines and synapses. The processing circuit is coupled to the switching circuit and the sensing circuit and is configured to connect a particular column line in the column lines to the first terminal by using the switching circuit, obtain a first voltage value from the particular column line by using the sensing circuit when the particular line is connected to the first terminal, connect the particular column line to the second terminal by using the switching circuit, obtain a second voltage value from the particular column line by using the sensing circuit when the particular line is connected to the second terminal, and estimate a sum-of-product sensing value according to a voltage difference between the first voltage value and the second voltage value.

10 Claims, 3 Drawing Sheets

NEUROMORPHIC COMPUTING SYSTEM AND CURRENT ESTIMATION METHOD USING THE SAME

TECHNICAL FIELD

The present invention generally relates to a neuromorphic computing system, in particular to a neuromorphic computing system implemented by using hardware array structure.

BACKGROUND

Recently, neuromorphic computing devices implemented by using hardware array structures are proposed. Compared to those devices performing neuromorphic calculations by using processors (e.g., CPUs), the neuromorphic computing devices have advantages of low power consumption.

The neuromorphic computing device usually includes a plurality of synapses, with each of which corresponds to a weighting value. When an input vector is applied to the neuromorphic computing device, the input vector is multiplied by a weighting vector consists of weighting values corresponding to one or more synapses relating to the input vector, so that a sum-of-product sensing current is generated on the output channel. The magnitude of the sum-of-product sensing current reflects a result of sum-of-product.

However, as the number of synapses increases, the sum-of-product sensing current on the output channel may become large, resulting in high energy dissipation.

SUMMARY

The present invention generally relates to a neuromorphic computing system implemented by using a hardware array structure. According to embodiments of the present invention, each output channel of the synapse array may be electrically connected to a first terminal or a second terminal in a switchable manner. The output channel may have a first voltage value when it is connected to the first terminal, and have a second voltage value when it is connected to the second terminal. The sun-of-product current value may be estimated according to a difference between the first voltage value and the second voltage value. Compared to conventional methods that a large sum-of-product current flowing through the output channel may be measured directly for calculation, according to the present invention, the output channel connected to the first terminal or the second terminal can only conduct a limited current, or even no current is conducted. Therefore, the energy dissipation can be effectively reduced.

According to one aspect of the present invention, a neuromorphic computing system is provided. The neuromorphic computing system includes a synapse array, a switching circuit, a sensing circuit and a processing circuit. The synapse array includes a plurality of row lines, a plurality of column lines and a plurality of synapses positioned at intersections of the row lines and column lines. The switching circuit is coupled to the synapse array and is configured to connect the column lines to a first terminal or a second terminal. The sensing circuit is coupled to the synapse array and is configured to sense voltage values and current values on the column lines. The processing circuit is coupled to the switching circuit and the sensing circuit and is configured to connect a particular column line in the column lines to the first terminal by using the switching circuit, obtain a first voltage value from the particular column line by using the sensing circuit when the particular line is connected to the first terminal, connect the particular column line to the second terminal by using the switching circuit, obtain a second voltage value from the particular column line by using the sensing circuit when the particular line is connected to the second terminal, and estimate a sum-of-product sensing value according to a voltage difference between the first voltage value and the second voltage value.

According to another aspect of the present invention, a current estimation method of a neuromorphic computing system is provided. The neuromorphic computing system includes a synapse array, a switching circuit, a sensing circuit and a processing circuit. The synapse array includes a plurality of row lines, a plurality of column lines and a plurality of synapses positioned at intersections of the row lines and column lines. The current estimation method includes the following. A particular column line in the column lines is electrically connected to the first terminal by using the switching circuit. A first voltage value is obtained from the particular column line by using the sensing circuit when the particular line is electrically connected to the first terminal. The particular column line is electrically connected to the second terminal by using the switching circuit. A second voltage value is obtained from the particular column line by using the sensing circuit when the particular line is electrically connected to the second terminal. A sum-of-product sensing value is estimated according to a voltage difference between the first voltage value and the second voltage value by using the processing circuit.

Figure 1:
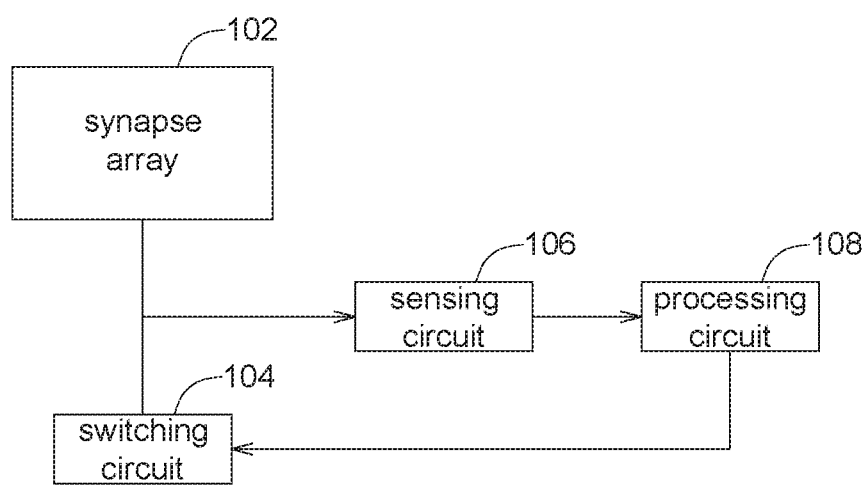
FIG. 1 is a block diagram of an example neuromorphic computing system according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a block diagram of an example neuromorphic computing system according to one embodiment of the present invention. The neuromorphic computing system includes a synapse array 102, a switching circuit 104, a sensing circuit 106 and a processing circuit 108. The switching circuit 104 and the sensing circuit 106 are coupled to the synapse array 102. The processing 108 is coupled to the switching circuit 104 and the sensing circuit 106.

The synapse array 102 may perform sum-of-product calculation by multiplying an input vector by a weighting vector formed by one or more synapses. The switching circuit 104, controlled by the processing circuit 108, is configured to connect each output channel of the synapse array 102 to a first terminal or a second terminal. The sensing circuit 106 may sense current values and voltage values on the column lines. Therefore, the sensing circuit 106 may sense a first voltage value on the output channel when the output channel is connected to the first terminal, and sense a second voltage value on the output channel when the output channel is connected to the second terminal. The processing circuit 108 may estimate the magnitude of the sum-of-product sensing current value according to a voltage difference between the first voltage value and the second voltage value.

The sensing circuit 106 may include, for example, a sensing amplifier. The processing circuit 108 may be realized by, for example, a micro-processor, a micro-controller, a chip and/or a circuit board.

Figure 2:
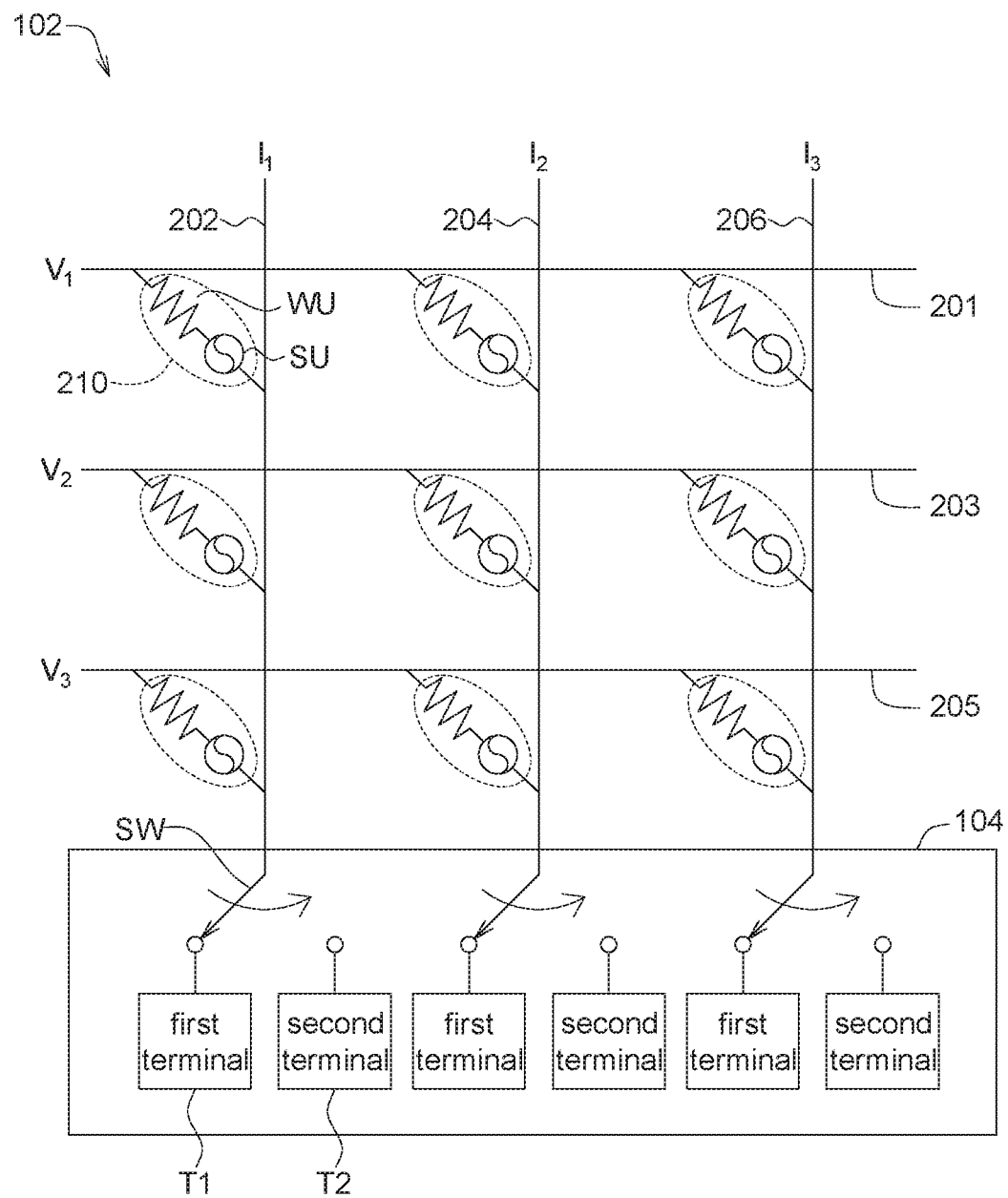
FIG. 2 schematically illustrates circuit structures of the synapse array and the switching circuit.

FIG. 2 schematically illustrates circuit structures of the synapse array 102 and the switching circuit 104. Although 3×3 synapses are shown in FIG. 2, it should be noted that any quantity and combination of the synapses may be included in the neuromorphic array 102.

As shown in FIG. 2, the synapse array 102 includes a plurality of row lines 201, 203, 205, a plurality of column lines 202, 204, 206 and a plurality of synapses 210 positioned at intersections of the row lines 201, 203, 205 and the column lines 202, 204, 206.

The row lines 201, 203 and 205 are used as input channels for receiving input voltages $V_1$, $V_2$ and $V_3$, respectively. The input voltages $V_1$, $V_2$ and $V_3$ may be considered as an input vector [$V_1$, $V_2$, $V_3$] provided to the system. In response to receiving input voltages $V_1$, $V_2$ and $V_3$ from the row lines 201, 203 and 205, the synapses 210 may form sensing currents $I_1$, $I_2$ and $I_3$ on the respective column lines 202, 204 and 206 which are used as output channels of the array.

The synapses 210 may be any type of weighting units applicable to neuromorphic computing devices, such as "1S1R" circuit structure formed by a resistive element WU and a selector SU (e.g., a transistor) connected in series.

The switching circuit 104 may connect one end of each column line 202, 204, 206 to the first terminal T1 or the second terminal T2 through the switch element SW. The first terminal T1 and the second terminal T2 are not ground terminals. Unlike a conventional neuromorphic computing device forming a large sum-of-product sensing current on a column line connected to the ground, when the column lines 202, 204, 206 are connected to the first terminal T1 or the second terminal T2, the sensing currents $I_1$, $I_2$, $I_3$ on the column lines 202, 204, 206 are limited to a predetermined small value (much smaller than the sum-of-product sensing current), or even no current is generated.

In an example, the first terminal T1 is a floating node and the second terminal T2 is a current limiting element such as a current mirror, a transistor or any other current source capable of providing constant/limited current.

Although three pairs of the first terminal T1 and the second terminal T2 are shown in FIG. 2, it should be noted that any quantity and combination of the first terminal T1 and the second terminal T2 may be included in the switching circuit 104. For example, more than one column lines may share the same first terminal T1 and/or the second terminal T2.

The sensing circuit 106 is coupled to the column lines 202, 204, 206. The sensing circuit 106 may sense the voltage value and the current value presented on each column line 202, 204, 206 that is operated in a first state (i.e., a state that the column line is connected to the first terminal T1) or a second state (i.e., a state that the column line is connected to the second terminal T2), and provide the sensing results to the processing circuit 108 for estimating the sum-of-product sensing current value.

For example, provided that the first terminal T1 is a floating node and the second terminal T2 is a current limiting element, the processing circuit 108 may first set a column line to be read (e.g., column line 202) to be operated in the first state by using the switching circuit 104, and obtain a first voltage value on the column line by using the sensing circuit 106. Then the processing circuit 108 may set the column line to be operated in the second state, so as to obtain a second voltage value on the column line and a sensing current value conducted through the column line. By doing this, the processing circuit 108 may estimate the sum-of-product sensing current value ($I_{sp}$) based on a product of a voltage difference between the first voltage value ($V_a$) and the second voltage value ($V_b$) and the sensing current value ($I_s$). For example, the sum-of-product sensing current value $I_{sp}$ can be expressed as follows:

$$I_{sp} = I_s \times \frac{V_a}{|V_a - V_b|}. \qquad \text{(equation 0)}$$

Taking the column line 202 as an example, in order to estimate the sum-of-product sensing current value on the column line 202, the processing circuit 108 may first float the column line 202 (i.e., connect the column line 202 to the first terminal T1) by using the switching circuit 104 and obtain the first voltage value (e.g., 0.5V) on column line 202 by using the sensing circuit 106.

Then, in response to switching the column line 202 to be connected to the second terminal T2 realized by a current source of 50 μA, the processing circuit 108 obtains the second voltage value (e.g., 0.4V) on column line 202 by using the sensing circuit 106.

After obtaining the first and second voltage values, the processing circuit 108 estimates, according to equation 0, the sum-of-product sensing current value as follows:

$$50 \ \mu A \times \frac{0.5 \ V}{0.5 \ V - 0.4 \ V} = 250 \ \mu A.$$

For better comprehension, the following illustrates why equation 0 can be used in estimating the sum-of-product sensing current.

First, it is known that when a column line is connected to the ground, the current formed on the column line is equivalent to the sum-of-product sensing current, which can be expressed as follows:

$$\sum_i g_{out,i} \cdot V_i = I_{out}|_{ground}, \qquad \text{(equation 1)}$$

where $g_{out,i}$ represents a weighting value of a synapse coupled to the $i^{th}$ row line and the column line to be read, $I_{out}|_{ground}$ represents the sensing current value formed on the column line connected to the ground (i.e., the sum-of-product sensing current value ($I_{sp}$) to be estimated).

In order to reduce the currents occurs on the column line during the sum-of-product calculation, the switching circuit 104 may connect the column line to a floating node (i.e., the first terminal T1 in this example) in response to the processing circuit 108. When the column line is floating, the column line conducts no current (i.e., the sensing current $I_{out}|_{floating}$ on the column line is zero) and presents a balanced voltage value $V_{out}|_{floating}$ (i.e., the first voltage value $V_a$ in this example). Accordingly, equation 1 can be rewritten as follows:

$$\sum_i g_{out,i} \cdot (V_i - V_{out}|_{floating}) = I_{out}|_{floating} = 0 \quad \text{(equation 2)}$$

$$\Rightarrow I_{out}|_{ground} = \sum_i g_{out,i} \cdot V_i = G_{out} \cdot V_{out}|_{floating},$$

$$\text{where } G_{out} = \sum_i g_{out,i}.$$

The switching circuit 104 may further connect the column line to a current limiting element (i.e., the second terminal T2 in this example) in response to the processing circuit 108. At this time, the column line may conduct a sensing current $I_s$ and present a voltage value $V_{out|Iout=Is}$ shown as follows:

$$V_{out}|_{Iout=Is} = (1-\alpha) \cdot V_{out}|_{floating}, \quad \text{(equation 3)}$$

wherein α ranges from 0 to 1.

According to equations 1, 2 and 3, it can be obtained that $$\sum_i g_{out,i} \cdot (V_i - V_{out}|_{Iout=Is}) = I_s \quad \text{(equation 4)}$$

$$\Rightarrow \sum_i g_{out,i} \cdot V_i - (1-\alpha) \cdot G_{out} \cdot V_{out}|_{floating} = I_s$$

$$\Rightarrow I_{out}|_{ground} = \frac{I_s}{\alpha} = I_s \frac{V_{out}|_{floating} - V_{out}|_{Iout=Is}}{V_{out}|_{floating}},$$

As can be seen, the equation 4 and the equation 0 have the same mathematical representation.

In other examples, the first terminal T1 and the second terminal T2 may be two current limiting elements corresponding to different current values. At this time, when a column line is terminated by the first terminal T1, the column line conducts a first sensing current and has a first voltage value. When the column line is terminated by the second terminal T2, the column line conducts a second sensing current and has a second voltage value Then, the processing circuit 108 may use the first sensing current value, the first voltage value, the second sensing current value and the second voltage value to estimate the sum-of-product sensing current corresponding to the column line, by simply modifying the derivation process from equation 1 to 4.

Figure 3:
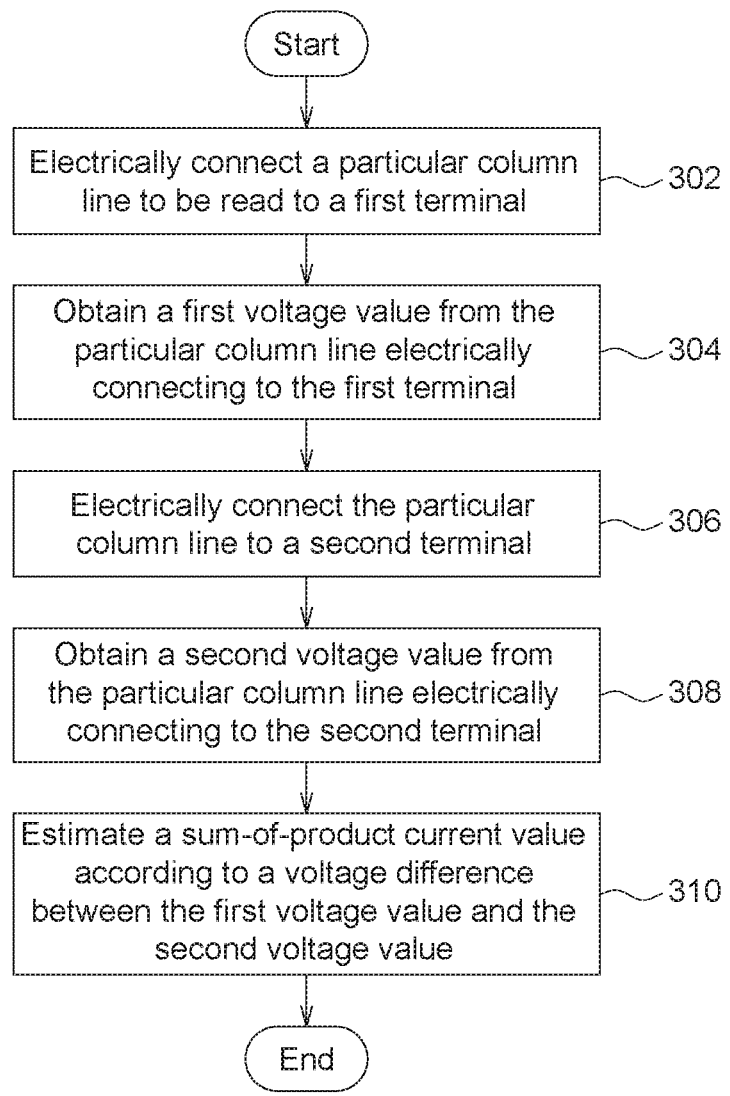
FIG. 3 is a flowchart of a current estimation method of the neuromorphic computing system in accordance with one embodiment of the present invention.

FIG. 3 is a flowchart of a current estimation method of the neuromorphic computing system in accordance with one embodiment of the present invention.

At step 302, the switching circuit 104 electrically connects a particular column line to be read to the first terminal T1.

At step 304, the processing circuit 108 obtains a first voltage value from the particular column line when the particular column line is electrically connected to the first terminal T1 by using the sensing circuit.

At step 306, the switching circuit 104 electrically connects the particular column line to the second terminal T2.

At step 308, the processing circuit 108 obtains a second voltage value from the particular column line when the particular column line is electrically connected to the second terminal T2 by using the sensing circuit.

At step 310, the processing circuit 108 estimates a sum-of-product sensing current value according to a voltage difference between the first voltage value and the second voltage value.

In one embodiment, in order to solve the problem that the voltage difference between the first voltage value and the second voltage value may be too small to be read, the voltage difference may be converted into time domain through a specially-designed sensing technology, so that the sum-of-product sensing current value can be estimated according to the converted result. For example, it can be configured that when a column line is operated in the first/second state, the column line charges a capacitor so that the voltage difference between the first voltage value and the second voltage value can be obtained from the charging/discharging time of the capacitor, thereby estimating the sum-of-product sensing current value.

Based on the above, the present invention generally relates to a neuromorphic computing system implemented by using hardware array structure. According to embodiments of the present invention, each output channel of the synapse array may be electrically connected to a first terminal or a second terminal in a switchable manner. The output channel may have a first voltage value when it is connected to the first terminal, and have a second voltage value when it is connected to the second terminal. The sun-of-product current value may be estimated according to a difference between the first voltage value and the second voltage value. Compared to conventional methods that a large sum-of-product current flowing through the output channel may be measured directly for calculation, according to the present invention, the output channel connected to the first terminal or the second terminal can only conduct a limited current, or even no current is conducted. Therefore, the energy dissipation can be effectively reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A neuromorphic computing system, comprising:
   a synapse array comprising:
      a plurality of row lines;
      a plurality of column lines; and
      a plurality of synapses positioned at intersections of the row lines and column lines;
   a switching circuit, coupled to the synapse array, configured to electrically connect each of the column lines to a first terminal or a second terminal;
   a sensing circuit, coupled to the synapse array, configured to sense voltage values and current values on the column lines; and
   a processing circuit coupled to the switching circuit and the sensing circuit and configured to:
      electrically connecting a particular column line in the column lines to the first terminal by using the switching circuit;
      obtain a first voltage value from the particular column line by using the sensing circuit when the particular column line is electrically connected to the first terminal;
      electrically connect the particular column line to the second terminal by using the switching circuit;
      obtain a second voltage value from the particular column line by using the sensing circuit when the particular column line is electrically connected to the second terminal;

estimate a sum-of-product sensing value according to a voltage difference between the first voltage value and the second voltage value.

2. The neuromorphic computing system according to claim 1, wherein the first terminal is a floating node and the second terminal is a current limiting element.

3. The neuromorphic computing system according to claim 2, wherein the processing circuit is further configured to obtain a sensing current value on the particular column line by using the sensing circuit when the particular is electrically connected to the second terminal, and estimate the sum-of-product sensing current value according to a product of the voltage difference and the sensing current value.

4. The neuromorphic computing system according to claim 3, wherein the sum-of-product sensing current value ($I_{sp}$) is:

$$I_{sp} = I_s \times \frac{V_a}{|V_a - V_b|}$$

wherein $I_s$ represents the sensing current value, $V_a$ represents the first voltage value and $V_b$ represents the second voltage value.

5. The neuromorphic computing system according to claim 2, wherein the current limiting element is a current mirror or a transistor.

6. A current estimation method of a neuromorphic computing system, wherein the neuromorphic computing system comprises a synapse array, a switching circuit, a sensing circuit and a processing circuit, the synapse array comprises a plurality of row lines, a plurality of column lines and a plurality of synapses positioned at intersections of the row lines and column lines, the current estimation method comprises:
  electrically connecting a particular column line in the column lines to the first terminal by using the switching circuit;
  obtaining a first voltage value from the particular column line by using the sensing circuit when the particular column line is electrically connected to the first terminal;
  electrically connecting the particular column line to the second terminal by using the switching circuit;
  obtaining a second voltage value from the particular column line by using the sensing circuit when the particular column line is electrically connected to the second terminal;
  estimating a sum-of-product sensing value according to a voltage difference between the first voltage value and the second voltage value by using the processing circuit.

7. The current estimation method according to claim 6, wherein the first terminal is a floating node and the second terminal is a current limiting element.

8. The current estimation method according to claim 7, further comprising:
  obtaining a sensing current value on the particular column line by using the sensing circuit when the particular is electrically connected to the second terminal; and
  estimating the sum-of-product sensing current value according to a product of the voltage difference and the sensing current value through the processing circuit.

9. The current estimation method according to claim 8, wherein the sum-of-product sensing current value ($I_{sp}$) is:

$$I_{sp} = I_s \times \frac{V_a}{|V_a - V_b|}$$

wherein $I_s$ represents the sensing current value, $V_a$ represents the first voltage value and $V_b$ represents the second voltage value.

10. The current estimation method according to claim 7, wherein the current limiting element is a current mirror or a transistor.

* * * * *